United States Patent
Lund et al.

(10) Patent No.: US 6,860,152 B2
(45) Date of Patent: Mar. 1, 2005

(54) HIGH FREQUENCY MULTIPLE DEGREE OF FREEDOM VIBRATION TEST MACHINE

(75) Inventors: Douglas A. Lund, Anacortes, WA (US); William B. Woyski, Anacortes, WA (US)

(73) Assignee: Team Corporation, Burlington, WA (US)

(*) Notice: Subject to any disclaimer, the term of this patent is extended or adjusted under 35 U.S.C. 154(b) by 17 days.

(21) Appl. No.: 10/133,962

(22) Filed: Apr. 26, 2002

(65) Prior Publication Data

US 2003/0200811 A1 Oct. 30, 2003

(51) Int. Cl.[7] .............................................. G01M 7/06
(52) U.S. Cl. ........................................ 73/663; 73/665
(58) Field of Search ............................ 73/662–667, 668

(56) References Cited

U.S. PATENT DOCUMENTS

| | | | |
|---|---|---|---|
| 4,011,749 A | | 3/1977 | Cappel |
| 4,265,123 A | * | 5/1981 | Cappel .......................... 73/663 |
| 4,446,742 A | * | 5/1984 | Thompson et al. ........... 73/663 |
| 4,602,555 A | | 7/1986 | Bushey |
| 5,343,752 A | | 9/1994 | Woyski et al. |
| 5,544,528 A | | 8/1996 | Woyski et al. |
| 5,549,005 A | * | 8/1996 | Aoki et al. .................... 73/663 |
| 5,665,919 A | | 9/1997 | Woyski et al. |
| 5,996,417 A | | 12/1999 | Lund |

FOREIGN PATENT DOCUMENTS

| | | |
|---|---|---|
| JP | 54104866 | 8/1979 |
| JP | 08122199 | 5/1996 |

* cited by examiner

Primary Examiner—Hezron Williams
Assistant Examiner—Nashmiya Fayyaz
(74) Attorney, Agent, or Firm—Christie, Parker & Hale, LLP (57) ABSTRACT

A vibration test machine comprises a stationary outer frame, a shake table in the form of a mass to which vibration energy is transmitted inside the outer frame, a driven preload piston supported by the outer frame and coupled to one side of the shake table, a passive preload piston supported by the outer frame and coupled to the shake table on a side opposite from the driven preload piston, and an external force generator external to the outer frame and coupled to the driven piston for inducing high frequency vibrational energy to the driven piston which, in turn, transmits that vibration energy to the shake table. In one embodiment, a multiple degree of freedom shaker comprises multiple exterior force generators each coupled to a corresponding driven preload piston having a related passive preload piston on a opposite side of the shake table. The preload piston couplings to the shake table comprise self-aligning bearing pads to accommodate the multiple degrees of freedom vibrational motion induced in the shake table.

16 Claims, 12 Drawing Sheets

HIGH FREQUENCY MULTIPLE DEGREE OF FREEDOM VIBRATION TEST MACHINE

FIELD OF THE INVENTION

This invention relates to the simulation of a vibration environment for use in testing products which are subjected to vibration during use, and more particularly, to an improved vibration test machine which, in one embodiment, simulates a vibration environment in multiple degrees of freedom, at very high frequencies.

BACKGROUND OF THE INVENTION

Many products are subjected to mechanical vibrations during their lifetimes, and vibration testing of products during the design and manufacturing stages has proven very valuable to improve their expected lifetimes.

The experienced real world vibration usually includes all six degrees of freedom (DOF), that is, the vibration usually has linear acceleration components along the three orthogonal axes, and angular acceleration components about those axes. The best simulation of the vibration environment would include vibration in all six degrees of freedom.

Several vibration test machines have been designed to produce six degrees of freedom vibration. They often use hydraulic actuators to move a test table, on which the test article is mounted. Since each actuator mechanism usually produces motion in a single degree of freedom, each actuator must be coupled to the table with bearings that have five degrees of freedom. In this way, the actuator controls the single degree of freedom of the point on the table where its drive link is connected. The five DOF bearings allow motion in the other five degrees of freedom. With six actuators properly arranged, each controlling a single degree of freedom, all six degrees of freedom of the table can be controlled.

Many actuator and bearing configurations are possible to achieve six degrees of freedom vibration and/or shock. Spherical bearings at each end of the actuator, links with spherical bearings placed between the actuator and the table, or special five degree of freedom bearings that comprise both a sliding and rotating bearing in a single element are examples.

These systems are limited in their frequency response by the dynamics of the hydraulic shaker, the table, and any connecting links. A very fundamental limitation to the frequency response comes from the hydraulic shaker.

Typical hydraulic servo valves are limited to 50 or 100 Hz frequency response. U.S. Pat. No. 5,343,752, assigned to Team Corporation, discloses a servo valve and double-acting piston actuator that responds to 1000 to 2000 Hz depending on the size of the actuator. Several multi-degree of freedom systems are disclosed in that patent. Each uses a high frequency valve to produce higher vibration frequencies than previously attainable by a multiple degree of freedom shaker. One of those systems, referred to as the Cube test system, comprises actuators on the inside of the vibration table. This system improves on the frequency response of a six DOF vibration test system, raising the controllable frequency from about 50 Hz for the prior art, to about 250 Hz. Even greater frequency response is desired, so the Cube type system forms the basis upon which the improvements of the present invention are compared.

Compared to the Cube style multi-axis vibration table, the present invention has higher frequency response and better table uniformity (less distortion). Electro-dynamic (ED) actuators have better frequency response and better freedom from distortion than even the best electro-hydraulic (EH) shakers; and the smaller, stiffer table of the present invention provides a higher first mode frequency than the Cube test system. This translates to much higher G levels for the tests object.

The actuators of the Cube shaker are located inside the vibration table and are mounted to the reaction mass on legs that protrude through the bottom of the vibration table. It has been found that the mounting structure (legs) for the internal actuators has a relatively low natural frequency that limits the frequency response of that design to frequencies below what the actuators are capable of.

In addition, because the Cube shaker is carried (and vibrates) well above the reaction mass, large moments are generated that must be reacted to by the reaction mass. Keeping reaction mass motion to a minimum requires use of large reaction masses.

SUMMARY OF THE INVENTION

Briefly, one embodiment of the present invention comprises a vibration test machine having a stationary supporting frame, a shake table in the form of a rigid structure to which vibration energy is transmitted inside the supporting frame, a driven preload piston supported by the frame and coupled to one side of the shake table, a passive preload piston supported by the frame and coupled to the shake table on a side opposite from the driven preload piston, and an external force generator external to the supporting frame and coupled to the driven piston for inducing high frequency vibrational energy to the driven piston which, in turn, transmits that vibration energy to the shake table. The passive preload piston applies a force against the shake table which opposes the driven preload piston force.

In one embodiment, a multiple degree of freedom shaker comprises multiple exterior force generators each coupled to a corresponding driven preload piston and having a related passive preload piston on an opposite side the shake table. The preload piston couplings to the shake table comprise self-aligning bearing pads to accommodate the multiple degree of freedom vibrational motion induced in the shake table.

The present invention surrounds the shake table with a reaction mass (the supporting frame) so that the centers of gravity of the table and reaction mass are very close to each other. Two aspects of the test fixture are improved, compared with the Cube-type shaker. First, the reaction forces act much closer to the center of gravity of the reaction mass, reducing induced moments dramatically, and thereby reducing the required size of the reaction mass. Second, the shake table is smaller and has much lower mass, so the magnitudes of the reaction forces and moments are much lower than for the Cube configuration.

While the locations at which the vibration forces are applied are arranged in a spatial configuration similar to the Cube system, the actual force generating actuators are located outside the test table or supporting frame. This allows use of various types of force generating actuators. In one embodiment, the present invention uses electro-dynamic (ED) actuators, but the concept is not limited to ED shakers. Single-ended or double-ended electro-hydraulic (EH) shakers, or any of a variety of mechanical shakers, also can be used as the force generating drivers.

One embodiment of the present invention relates to a method of preloading a self-aligning hydrostatically lubricated slider bearing which is capable of carrying compression loads only. The bearing, in this invention, is used for connecting an external force-generating device to the shake table such that its motion is capable of providing multiple degrees of freedom vibration. The number of degrees of freedom of the vibration energy transmitted to the shake table may be from one to as many as six degrees of freedom.

Multiple degree of freedom shake tables are used to simulate vibration and shock conditions on test articles of many types. Six degrees of freedom simulation is the most complete. This invention allows multiple external force-generating devices that each produce single degree of freedom motion (push-pull forces in a straight line), such that an ED shaker or an EH shaker can be connected so that both the push and the pull forces are effectively transmitted to the shake table. In particular, this invention permits force generating devices such as ED shakers, which generally have access to the moving component (armature) from one end only, to be effectively connected to the multiple degree of freedom shake table. The invention also minimizes cross coupling connections between the mechanisms that connect the one-degree of freedom force generators to the shake table that moves with multiple degrees of freedom.

Thus, one embodiment of the invention comprises the combination of the stationary outer frame; the multi-degree of freedom shake table; external force generators, each of which can be an ED shaker; a driven preload piston and a passive preload piston used in pairs, one pair associated with each force generator; and hydrostatic self-aligning slider bearings coupling the preload pistons to the shake table.

These and other aspects of the invention will be more fully understood by referring to the following detailed description and the accompanying drawings.

DETAILED DESCRIPTION

Figure 1:
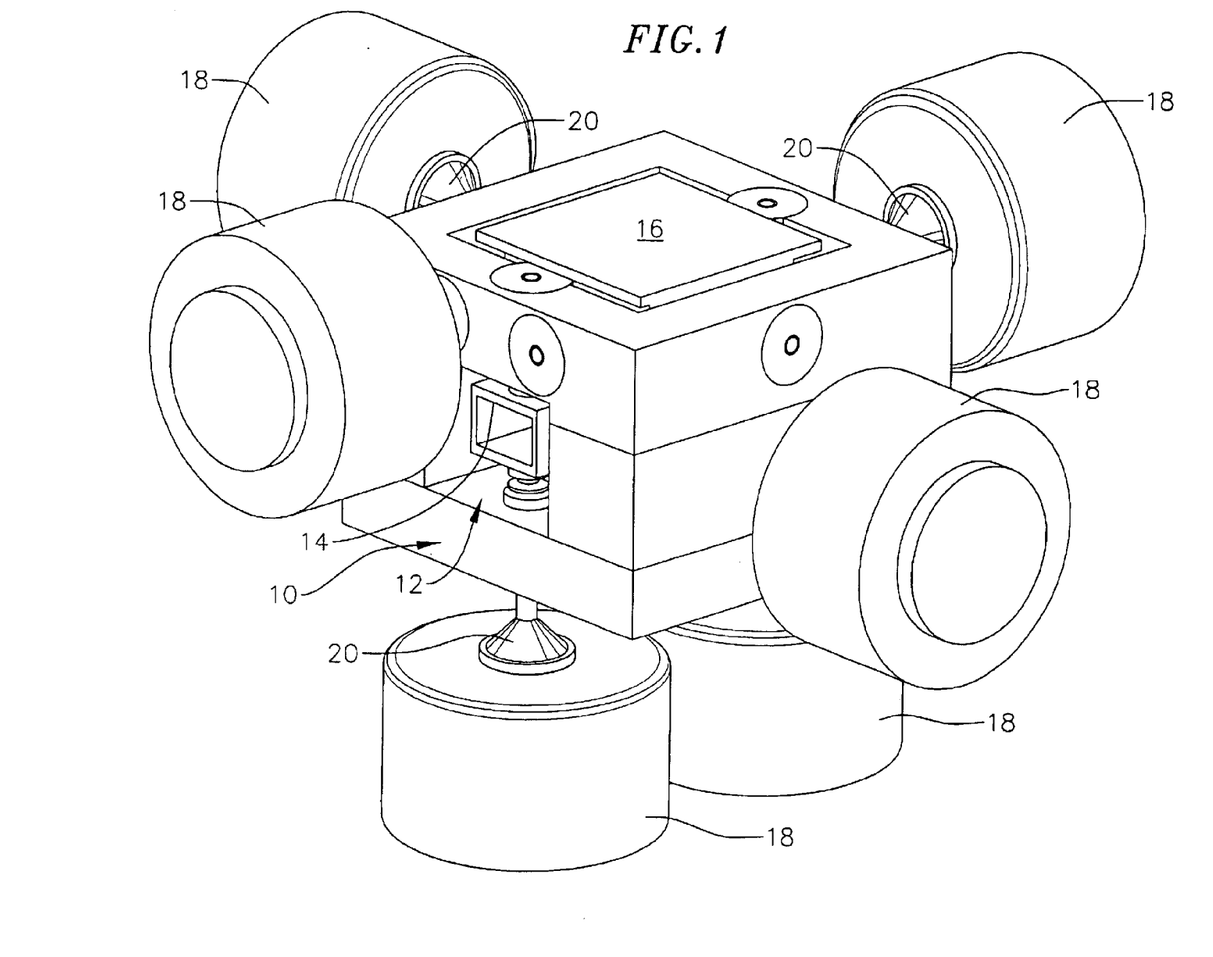
FIG. 1 is a perspective view showing a six-DOF shake table incorporating ED single DOF force generators.

FIG. 1 is a perspective view illustrating a multiple degree of freedom vibration test machine which includes a generally cube-shaped stationary rigid supporting frame 10. An internal void space 12 inside the supporting frame 10 contains a shake table 14 in the form of a rigid structure with high stiffness to which vibration energy is transmitted to provide the moving element of the shaker. A test table 16 is positioned in a horizontal plane on the top face of the shaker. The test table is rigidly affixed to the shake table, and a unit under test (not shown) is subjected to vibration testing when affixed to the test table. The supporting frame 10 and other components of the shaker assembly shown in FIG. 1 are mounted to a lower support structure which rests on the floor. Embodiments of the lower support structure are described below.

Separate vibration force generators 18 are positioned adjacent the outer faces of the rigid frame 10. The illustrated embodiment comprises a six degree of freedom shaker in which there are six force generators 18 positioned adjacent five faces of the cube-shaped supporting frame. There are two force generators arranged side-by-side adjacent a lower face of the cube-shaped frame, while the upper face which holds the test unit does not have an adjacent force generator. The other four force generators are positioned adjacent the remaining four sides of the cube-shaped frame. The vibration force generators transmit vibration energy at high frequency to the moving shake table element of the test machine. The force generators in the illustrated embodiment comprise electro-dynamic vibration force generators, although other types of force generators, such as electro-hydraulic force generators, can be used. In the illustrated embodiment, each force generator is coupled to the shake table through a corresponding pair of hydraulic pistons affixed to the stationary frame. These pistons, referred to herein as preload pistons, are described in more detail in FIGS. 2 through 4.

In the illustrated vibration test machine the electro-dynamic vibration force generators are mechanically coupled to the preload piston rods through corresponding conical-shaped connectors 20 which step down the diameters of the corresponding vibration elements of the electro-dynamic shaker. The electro-dynamic shaker generally comprises a cylindrical metal outer housing containing a voice coil that vibrates at high frequency inside an electromagnetic coil which also includes a field winding. The vibrating voice coil is of larger diameter than the driven piston rod to which the electro-dynamic shaker is coupled.

Figure 2:
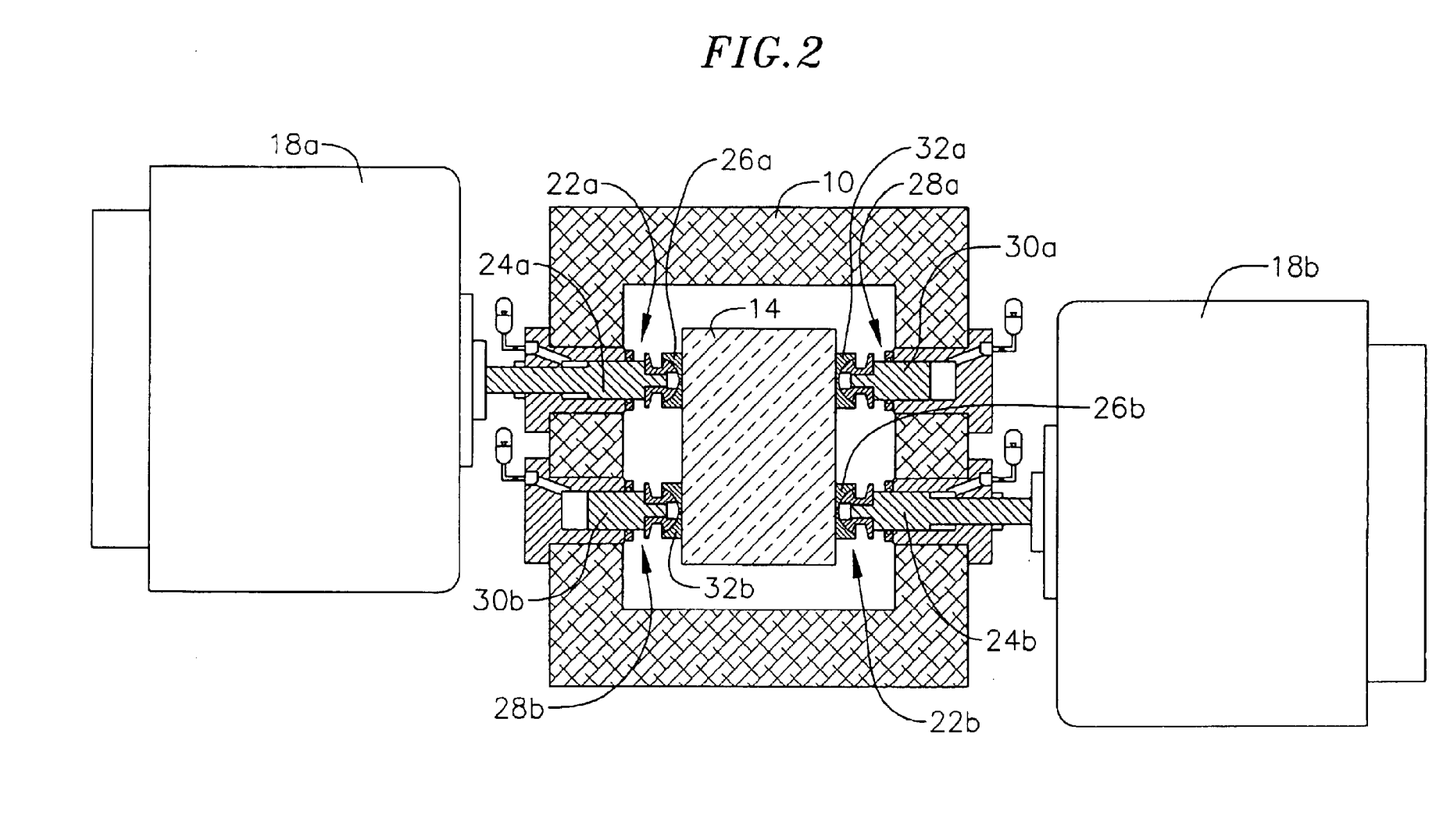
FIG. 2 is a schematic cross-sectional view showing a pair of force generators, a stationary frame, a multi-DOF shake table and a pair of preload generating pistons (driven piston and passive piston) that connect each force generator to the shake table.

FIG. 2 illustrates one embodiment of a system for mechanically coupling the external force generators to the internal shake table via corresponding preload devices. In the illustration, the force generators on opposite sides of the support frame 10 are referred to by reference numerals 18a and 18b. The force generator 18a shown on the left side of the frame is coupled to the shake table through a driven preload device 22a. Vibration energy from the moving voice coil of the force generator 18a is coupled to a preload piston 24a in the driven preload device. The piston 24a is rigidly affixed to the moving element of the force generator through the external connector 20 described above. The driven end of the piston 24a inside the frame is coupled to the shake table through a self-aligning hydrostatic slider bearing 26a. On the opposite side of the shake table, a passive preload device 28a is aligned axially with the driven preload device 22a. The passive preload device 28a is not coupled to a force generator and its function is to oppose the preload force of the driven preload piston 24a. The passive preload device includes a passive preload piston 30a coupled to the shake table by a self-aligning hydrostatic slider bearing 32a.

The force generator 18b shown on the right side of the support frame 10 is coupled to the shake table through preload devices similar to those described for the force generator 18a. The force generator 18b is thus coupled to the shake table by a driven preload device 22b having a driven preload piston 24b coupled to the shake table by a self-aligning bearing 26b. On the opposite side of the shake table a passive preload device includes a passive preload piston 30b aligned axially with the driver preload piston 24b. The passive preload piston 30b is coupled to the shake table by a self-aligning hydrostatic slider bearing 32b.

As best shown in FIG. 2, the output forces generated by the force generators 18a and 18b are spaced apart along parallel axes. This represents the push-pull arrangements of the two pairs of force generators aligned on opposite side faces of the cube shaped frame. The two force generators at the bottom of the frame have their vibrational force outputs along parallel axes coupled to opposite bottom sides of the shake table.

Figure 3:
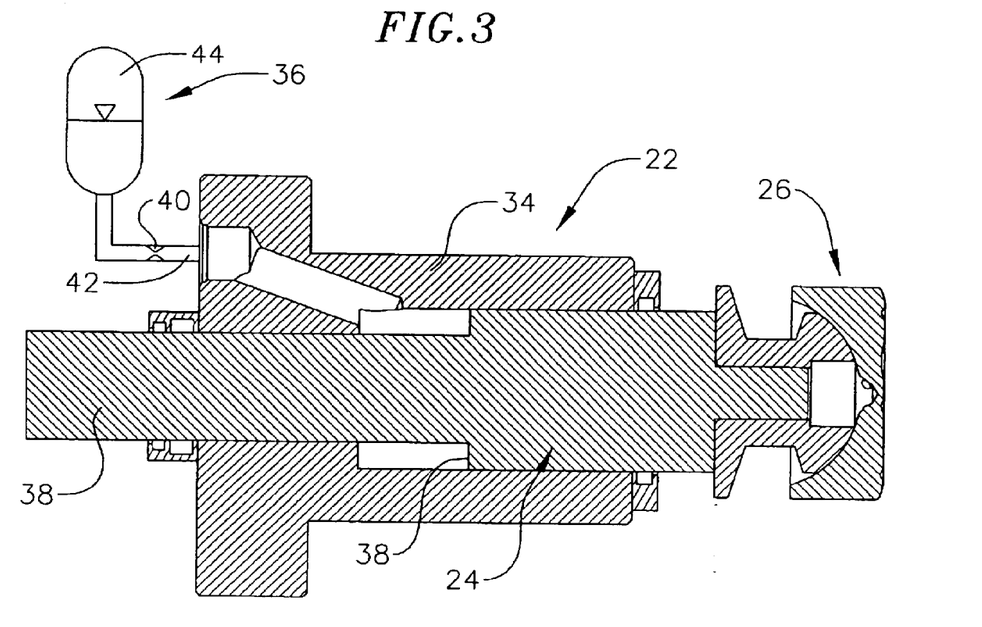
FIG. 3 is a schematic cross-sectional view of the driven preload piston.

The driven preload piston and its self-aligning hydrostatic slider bearing are shown in more detail in FIG. 3. The driven preload device 22 comprises the moving piston component 24 that has a stepped shaft, a housing 34, a hydraulic accumulator 36, and the self-aligning hydrostatic slider bearing 26. A smaller diameter end 38 of the shaft extends out through the body of the housing. This shaft extension provides the means for connecting the one DOF force generator to the moving piston such that both push and pull forces are transmitted into the driver piston.

The chamber volume created by the stepped piston profile is connected to the hydraulic accumulator 36 and filled with a fluid (typically hydraulic fluid) by connecting the chamber to an external source of fluid under pressure. The shoulder area created by the difference in the diameters of the piston extension and larger piston diameter provides a surface 39 that is acted upon by the fluid under pressure. This pressure produces a force on the piston and in turn preloads the self-aligning pad bearing 26 against a flat surface on the shake table. The accumulator 36 allows the piston 24 to extend and retract and maintain contact with the test fixture assembly. Minimizing pressure changes during operation allows more of the available force supplied by the external force generator to be transmitted to the shake table. An adjustable flow restriction device 40 (such as an adjustable orifice) can be incorporated in a fluid passageway 42 between the accumulator and the piston so that variable damping values can be achieved. Damping is useful in controlling structural resonance in the shake table. An upper portion 44 of the accumulator contains gas under pressure. The gas pressure is controlled to apply the equivalent of a low spring rate to enable the driven preload piston to maintain its initial preload force during use.

Figure 4:
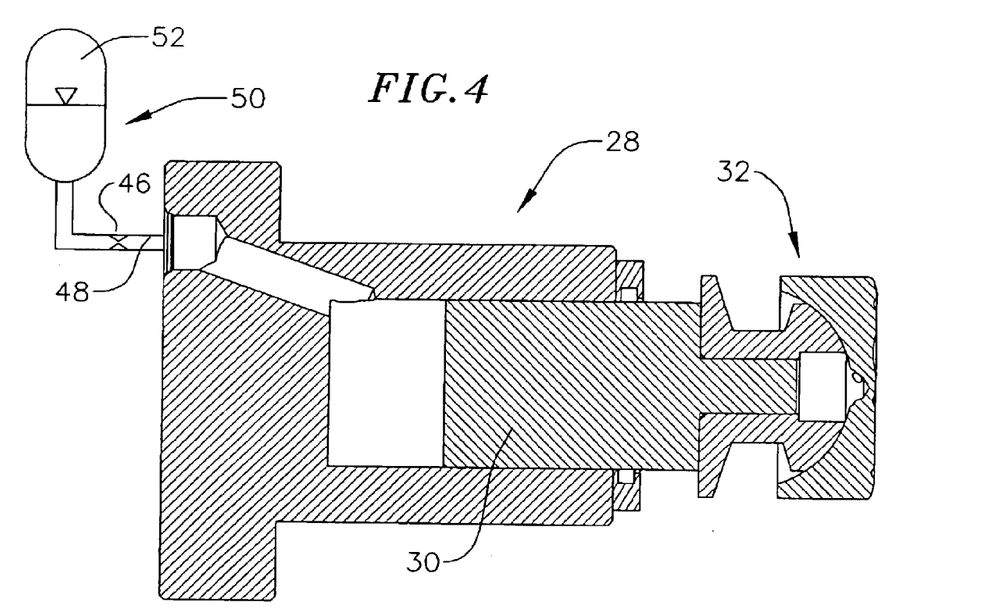
FIG. 4 is a schematic cross-sectional view of the passive preload piston.

The passive preload device 28 is shown in more detail in FIG. 4. It incorporates all of the features of the driven preload piston with the exception of the shaft extension. The passive preload device includes the preload piston 30 coupled to the shake table by the self-aligning bearing 32. A hydraulic accumulator 50 connects to the piston chamber through a line 48 having an adjustable flow restrictor 46. A gas volume 52 in the accumulator is controlled at a low spring rate to maintain the initial preload force. When pressurized it generates a force against the shake table which opposes the driven preload piston force. This force is generally equal to the preload force in the driven preload piston, but may also be adjusted to be less than or more than the preload force in order to produce different operating characteristics of the multi degree of freedom shake table.

In use, the preload pistons provide a means of transmitting the forces applied by the force generators to the shake table. The preload pistons are passive in the sense that they do not cause the motion of the shake table on their own accord. Their function is to apply an initial preload force that is greater than the force that is produced by the external force generators. This initial preload condition is critical for maintaining contact between the self aligning slider bearings and the shake table and for properly transmitting the external forces into the shake table. It is desirable for these preload forces to remain as very nearly constant as is practical for the best performance of the machine. One way of maintaining a nearly constant force is accomplished by the use of the gas/oil accumulators, but this is not the only method possible. The gas volume contained in the accumulators is used to minimize the change in pressure and therefore the change in preload force in the preload pistons as the pistons extend and retract. The dynamic forces created by the external force generators add and subtract with the preload forces in the preload pistons during the operation of the machine. If the dynamic forces were to exceed the initial preload forces, then the self aligning pad bearings might separate from the shake table surface. The preload pistons are one example of a preload device applying a fluid spring force; other preload devices for applying mechanical spring forces also could be used.

In one embodiment the self aligning bearings used with the preload pistons can be spherical bearings of the type described in U.S. Pat. No. 5,343,752, assigned to Team Corporation.

FIGS. 6 through 9 show an arrangement for supporting the vibration test fixture during use, and FIGS. 7 through 13 show an alternative support system. In both embodiments, a three-axis vibration test system is shown for simplicity, but these support systems also can be used for other force generating arrangements, such as a six degree of freedom system.

FIGS. 6 through 9 illustrate a support system in which the force generators 18 are each rigidly affixed to the stationary frame structure 10. This combination is mounted to a rigid lower support structure 60 which rests on the floor. The combined force generators and stationary frame are mounted on air springs 62 which isolate vibration caused by the shaker from being transmitted to the lower support structure, so that vibration generated during use is not transmitted to the floor.

FIGS. 10 through 13 illustrate an alternative support system in which the force generators can be mechanically isolated from the vibrating element of the test system. In this embodiment, each force generator 18 is surrounded by a corresponding U-shaped frame 64. Each force generator contains its own spring mechanism within the U-shaped frame for isolating vibration from the stationary frame 10. The U-shaped frames 64 and their corresponding force generators are rigidly affixed to the stationary frame 10. This combination is rigidly affixed to a rigid lower support structure 66. The entire vibration test fixture and the lower support structure are mounted to the floor on air springs 68 between the legs of the lower support structure and the floor. The air springs isolate the floor from vibration produced during use.

A computer controls the multi axis vibration system with special software designed specifically for multi axis motion control. These controllers are available from several manufacturers well known in the art.

In general, the computer estimates a linear model of the dynamics of the system that correlates the motion of the test article to the six drive signals to the force generators. The model accounts for the interactions between shakers as well as the dynamics of the test machine and the test article. It uses that model to calculate the drive signals to the force generators to produce the desired test vibration.

The static force applied by the preload pistons is controlled by adjusting the pressure regulators described previously to control the hydraulic pressure acting on them.

When the preload forces on the shake table are equal and opposite, the forces sum to zero and the shake table does not move, while at the same time the slider pad bearings are established in contact with the surface of the shake table under compressive loading. If the initial preload forces are adjusted to be not equal, then an external force must contribute additional steady state force in order for the sum of all forces to be zero. The external force generators can provide this external force, or it may be supplied by gravity. One application of different forces in the passive piston and the preload piston would be to offset the force of gravity on the shake table and the test article mounted on the shake table. Offsetting the force of gravity reserves all of the available driving force for generating motion during the vibration or shock test. Another benefit of varying the preload forces would be to allow the shake table system to produce higher accelerations of the shake table in a given direction when desired.

The fluid under pressure also creates forces on the housing of the driven preload piston and the passive preload piston. These forces are transmitted to the stationary frame. The stationary frame connects the housings of the preload piston assemblies such that the forces on the housings sum together. When the preload forces in the driven preload piston and its opposing passive preload piston are equal, the forces in the stationary frame sum to zero. This allows the body of the external force generator to be mechanically isolated from the stationary frame if desired. If the preload forces in the driver piston and its opposing passive piston are configured to be not equal, then the body of the external force generator is mechanically connected to the stationary frame so that the steady state external force supplied by the force generator can be reacted by the forces in the stationary frame.

Figure 5:
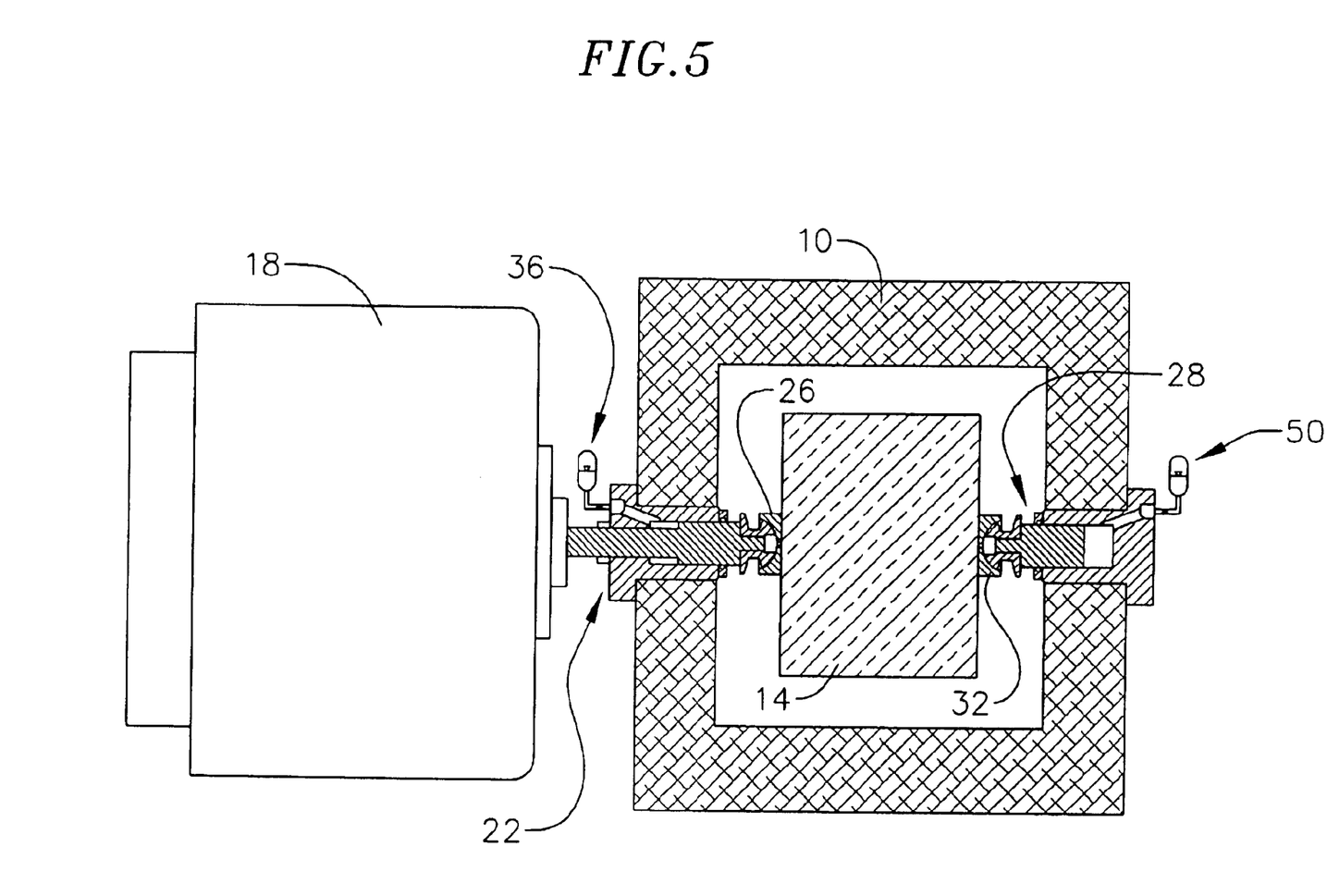
FIG. 5 is a schematic cross sectional view of an alternative form of the invention comprising a single DOF shake table.
Figure 6:
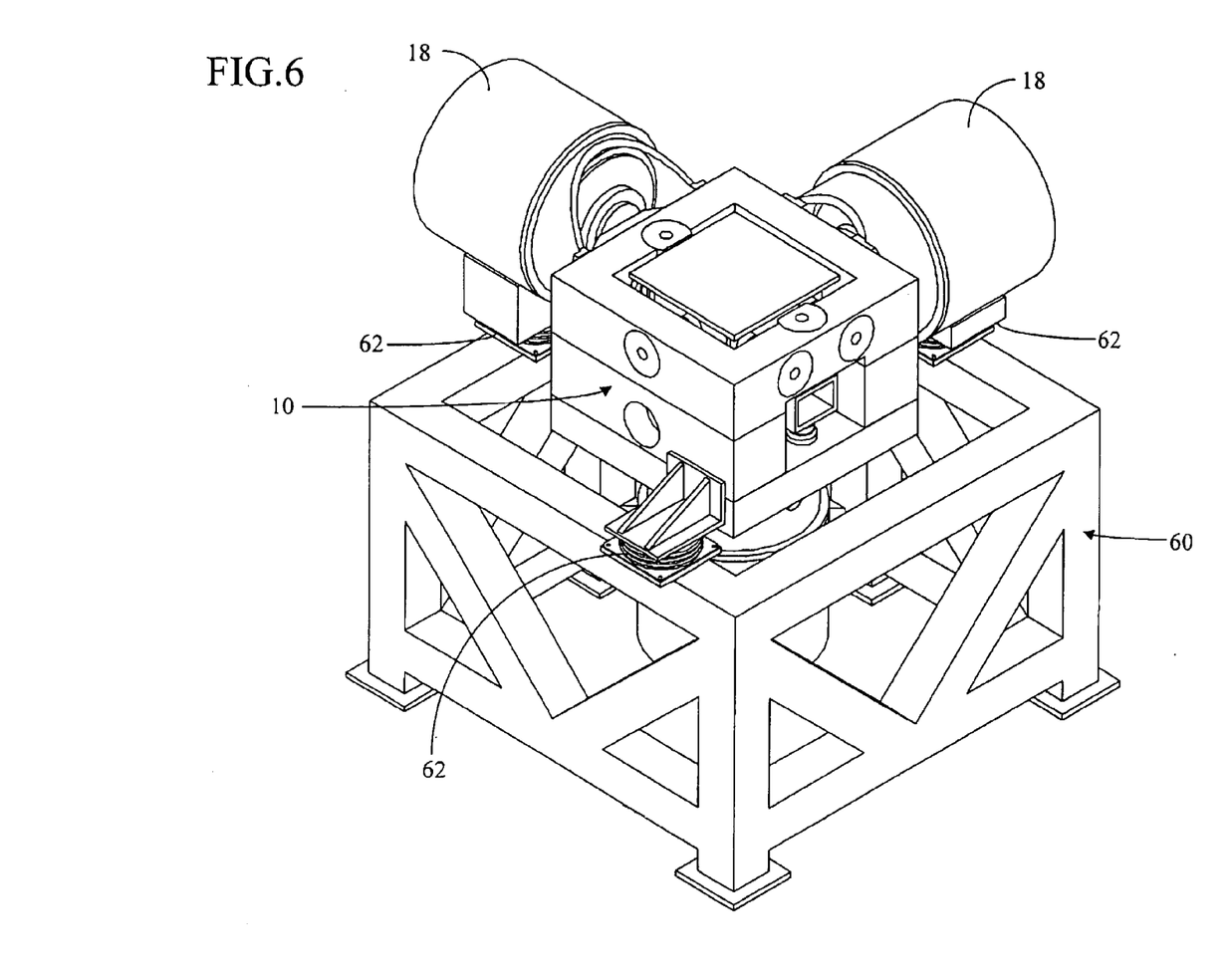
FIG. 6 is a perspective view illustrating one embodiment of a support system for the vibration test machine.
Figure 7:
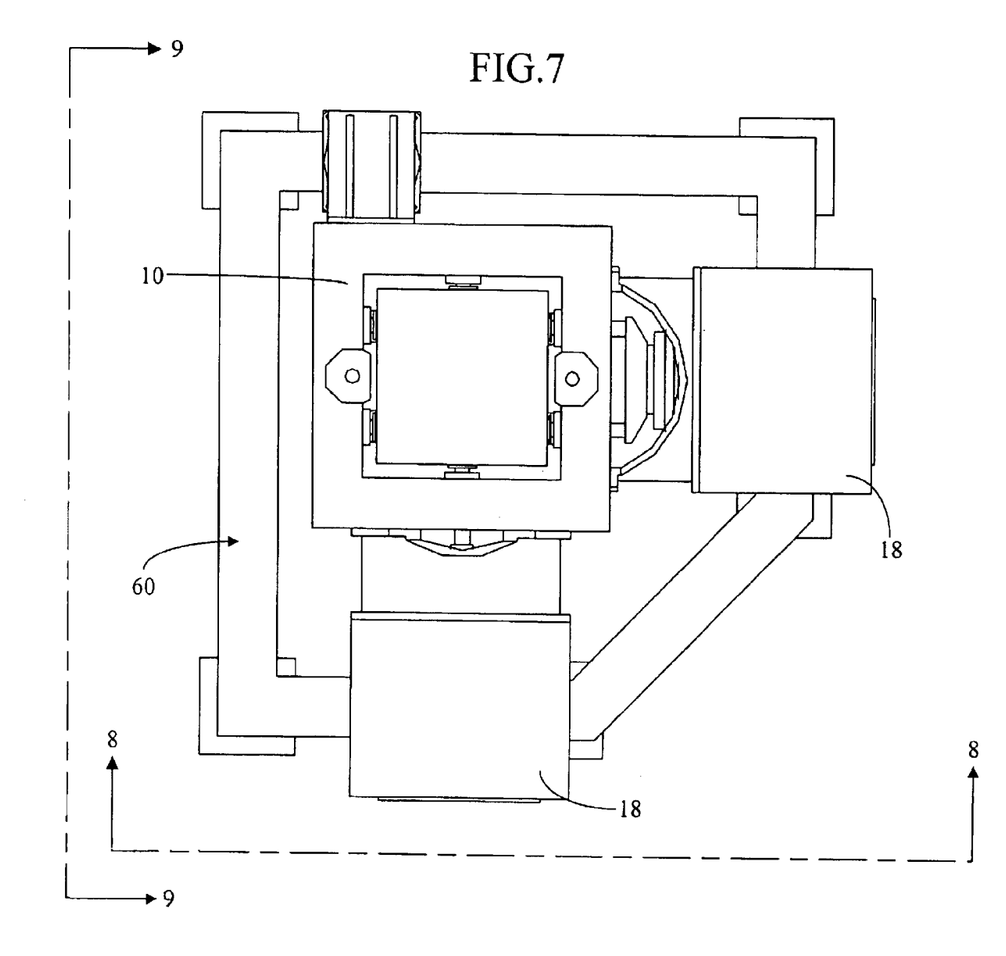
FIG. 7 is a top view of the support system shown in FIG. 6.
Figure 8:
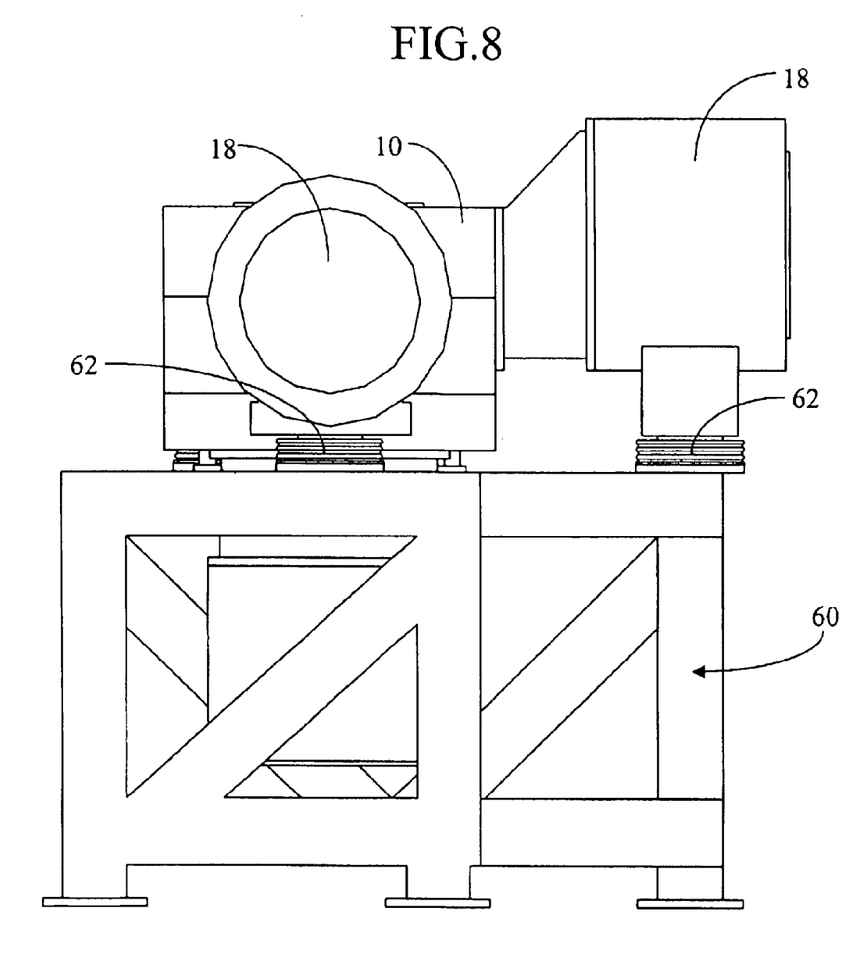
FIG. 8 is a side elevation view taken on line 8—8 of FIG. 7.
Figure 9:
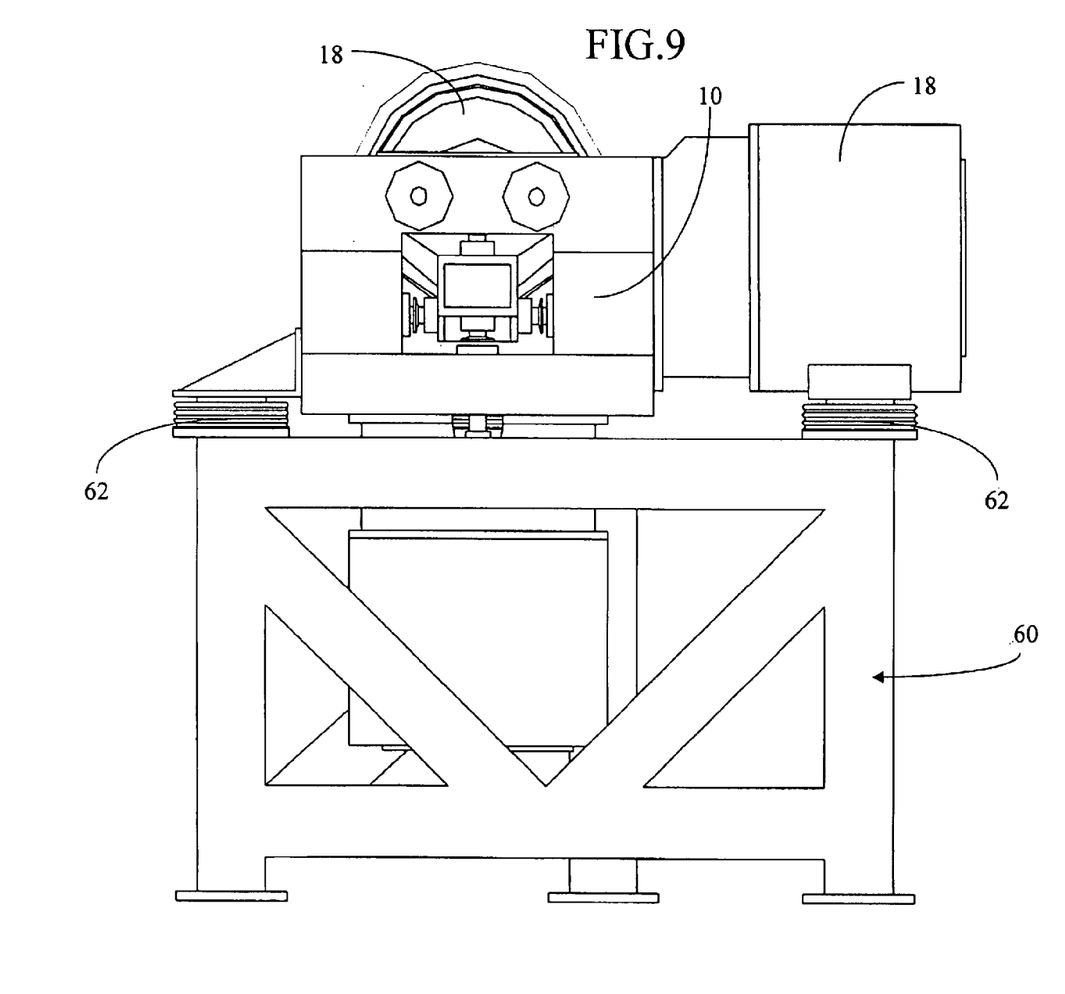
FIG. 9 is a side elevation view taken on line 9—9 of FIG. 7.
Figure 10:
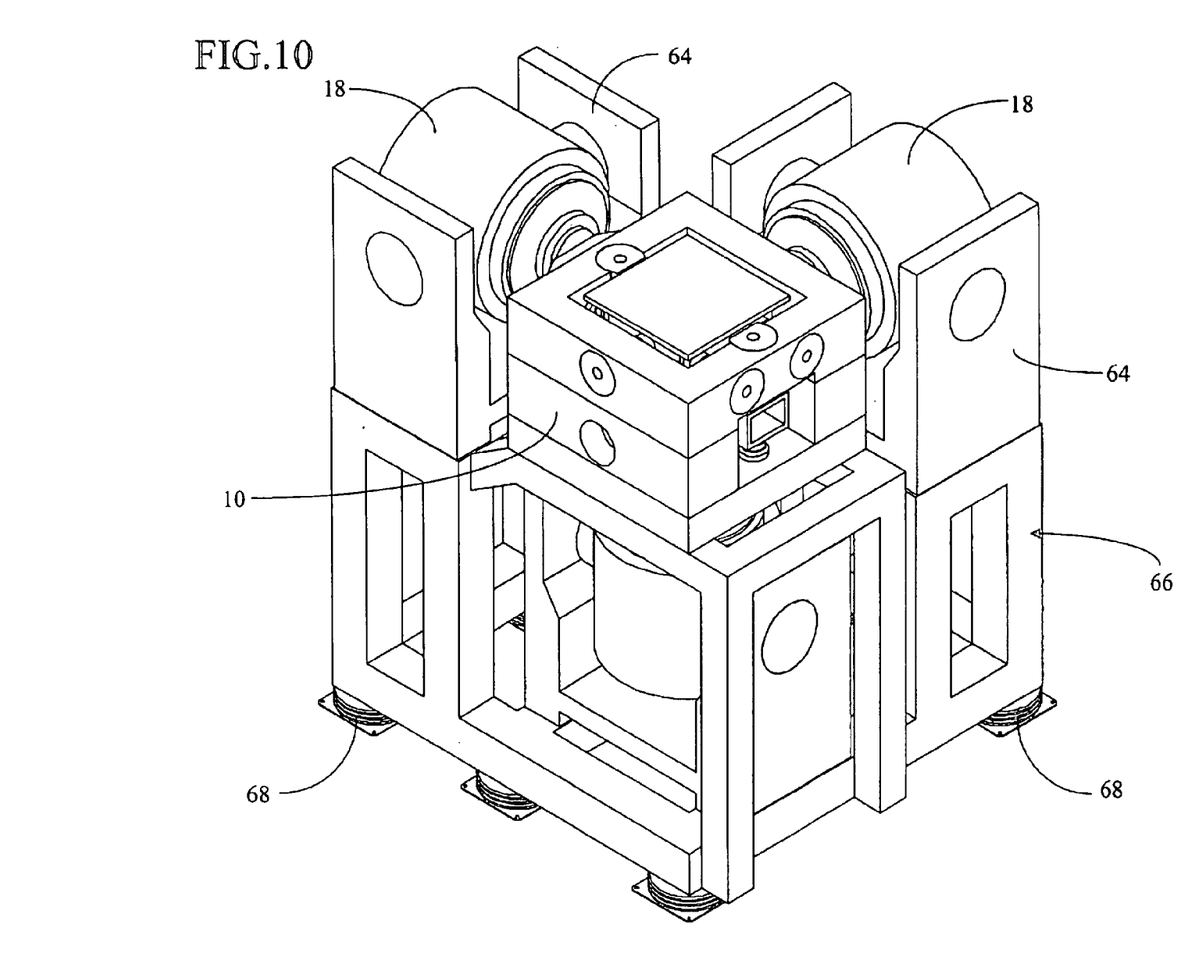
FIG. 10 is a perspective view showing an alternative support system for the vibration test machine.
Figure 11:
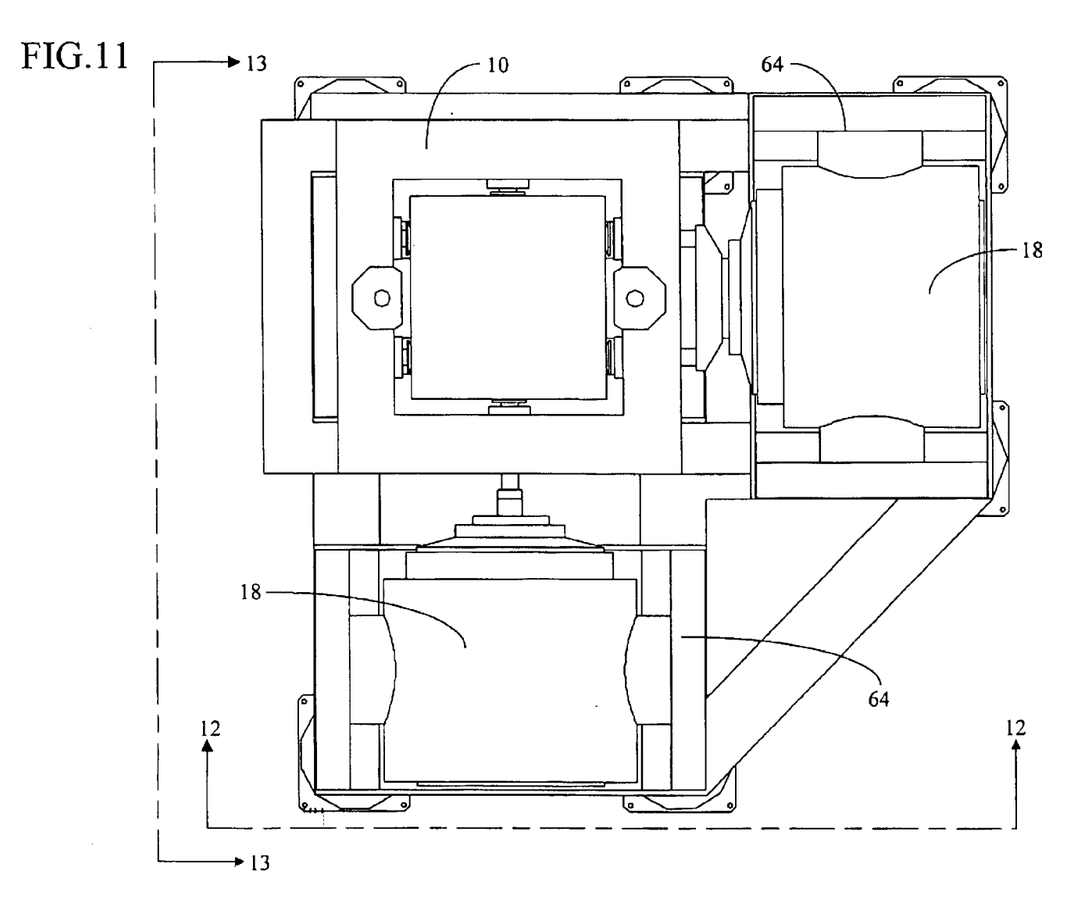
FIG. 11 is a top view of the support system shown in FIG. 10.
Figure 12:
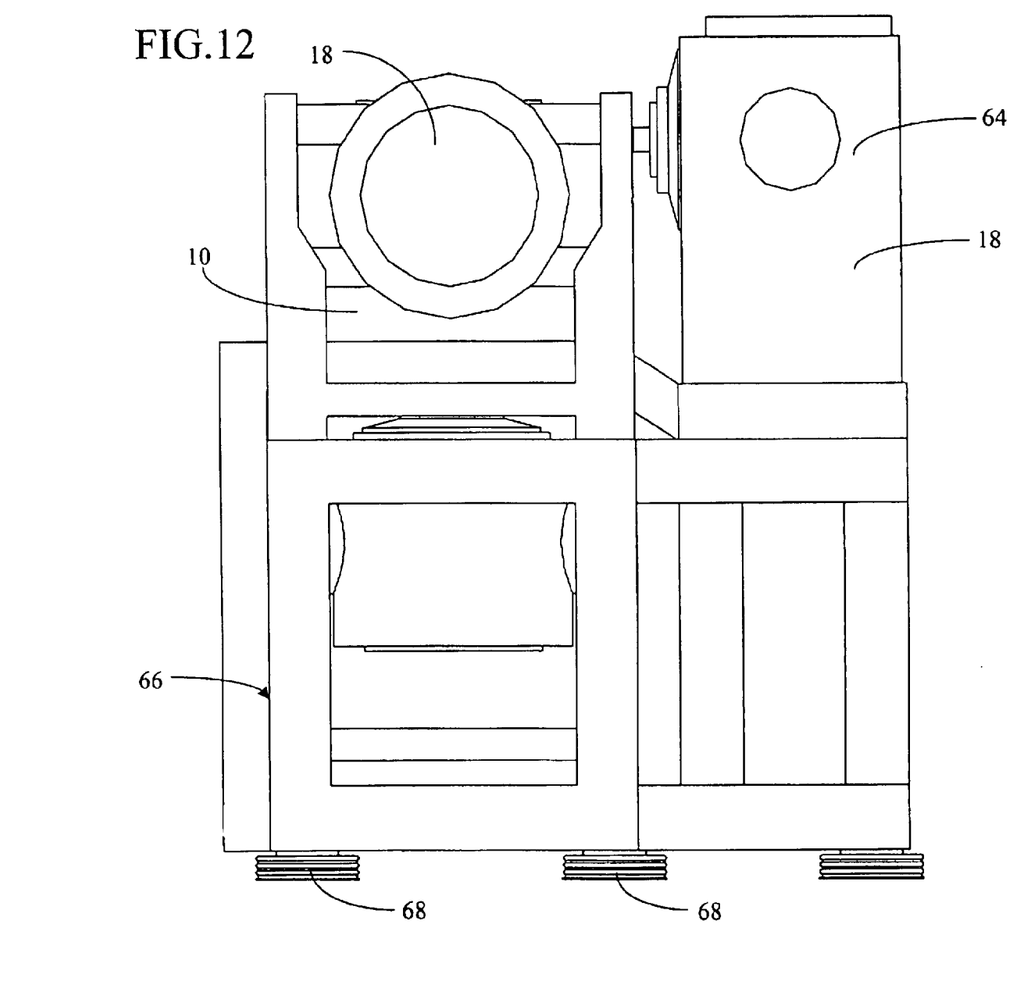
FIG. 12 is a side elevation view taken on line 12—12 of FIG.
Figure 13:
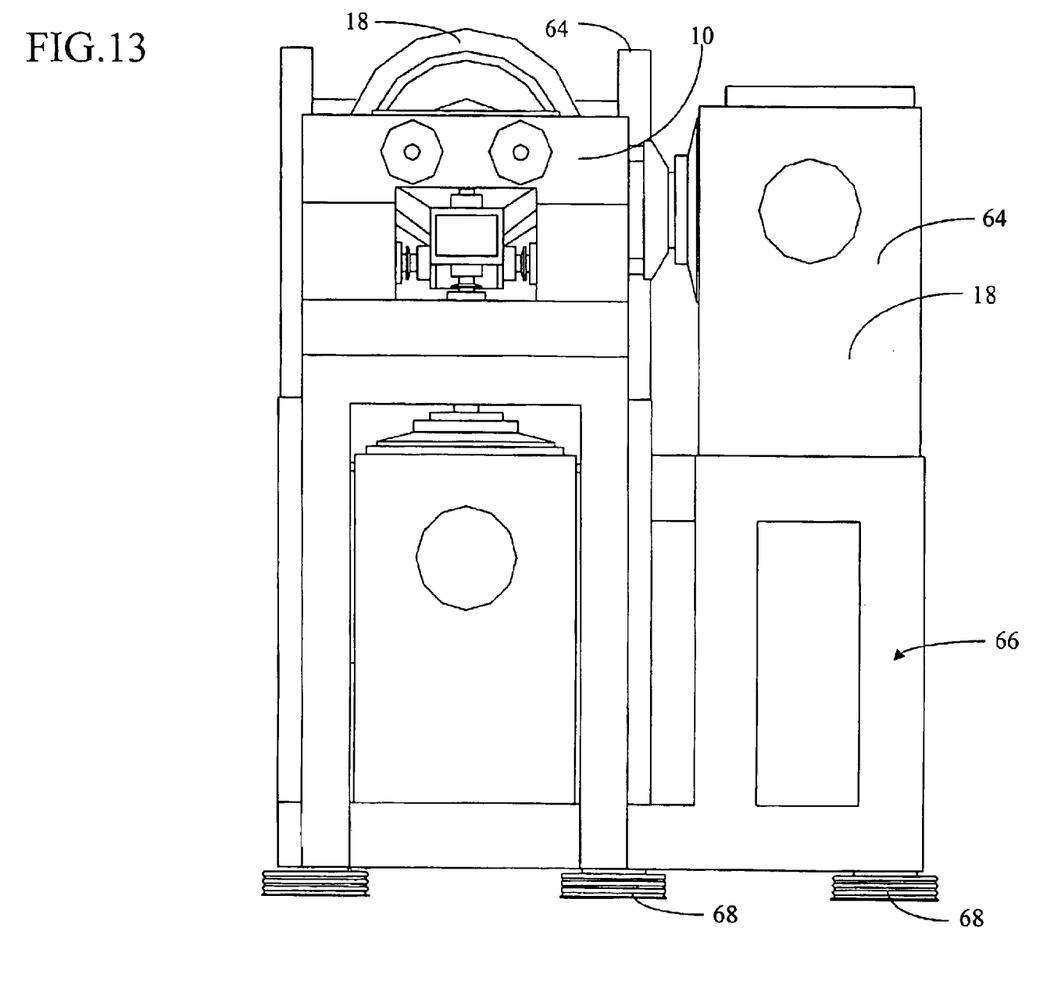
FIG. 13 is a side elevation view taken on line 13—13 of FIG. 11.

FIG. 5 is a cross-sectional view of an alternative form of the invention showing a simplified embodiment adopting the principles of this invention. In this arrangement, one driven preload piston and one passive preload piston are connected to the shake table, the supporting frame, and the external force generator. As shown in this embodiment, the external force generator can be an electro-dynamic shaker, although a hydraulic shaker also can be used. This combination can be repeated in other orientations to produce a multiple degree of freedom system.

In order to increase the force available for accelerating the shake table, it is possible to replace the passive preload piston assembly with a driven preload piston assembly. This configuration would allow the use of additional external force generating devices.

When a three DOF configuration that produces three translations and not rotations is desired, adjacent pairs of the driver preload pistons can be mechanically connected together so as to move together. The external force generator would then be connected so as to apply its force symmetrically to the pair of driven preload pistons.

If the driven preload piston force is configured to be greater than the opposing passive preload piston force, then the external force generator must contribute an additional steady state force in order for the sum of the steady state forces to sum to zero. The external shaker would have to apply a temporary tension load to the driven preload piston. When the test in initiated, the external force generator applies its force as a compressive force on the driven preload piston. The shaker force and the bias force then add together to produce a larger force (in one direction only), than could be created by the external force generator alone on the shake table. This configuration can be useful for tests such as shock pulses.

Biasing options that can be produced by the combination of the preload actuators comprise: (1) no biasing loads, i.e., the force of the driven piston is offset by an equal an opposite passive force in the push-pull arrangements described herein; (2) load bias to offset gravity loads; (3) load bias to create higher dynamic forces in one direction (either toward or away from the external force generator); and (4) preloads that are offset to produce controlled angular accelerations.

The preload force needs to be greater than the shaker force, and "equal and opposite" for use with electro-dynamic shakers or double acting hydraulic shakers. For a single-ended hydraulic shaker, the preload needs to be one-half the active cylinder force.

As mentioned previously, the external force generator can comprise a variety of devices to induce the desired high frequency vibration. For instance, electro-dynamic shakers available from the following manufacturers can be used in the present invention: Ling Electronics of Anaheim, Calif.; Unholtz-Dickie of Wallingford, Conn.; LDS of Great Britain; IMV of Japan; and RMS of Germany. Electro-hydraulic shakers available from Team Corporation, Burlington, Wash. and described in U.S. Pat. No. 5,343,752 can be used as a hydraulic force generator.

The invention has been described in relation to the alignment and use of shakers in the Cartesian coordinate system. The concepts contained herein, however, can be applied to a variety of kinematically appropriate orientations. The invention is not limited to orthogonal orientation of its elements.

What is claimed is:

1. A multiple degree of freedom vibration test machine comprising the combination of a stationary rigid frame; a multi-degree of freedom shake table inside the stationary frame; external force generators comprising electro-dynamic shakers; multiple pairs of driven and passive preload pistons, each pair comprising a driven preload piston and a corresponding passive preload piston on opposite sides of the shake table, one pair associated with each force generator and each pair arranged in a push-pull relationship affixed to opposite sides of the stationary frame; and hydrostatic self-aligning spherical slider bearings coupling the preload pistons to the shake table.

2. The vibration test machine according to claim 1 in which the external force generators are combined with the preload pistons to form a six degree of freedom shaker.

3. A multiple degree of freedom vibration test machine comprising a stationary outer frame, a shake table in the form of a rigid structure to which vibration energy is transmitted inside the outer frame, a plurality of external force generators external to the outer frame, each force generator for inducing vibration energy to the shake table in a corresponding degree of freedom of vibrational movement, each external force generator coupled to the shake table via a corresponding driven preload piston supported by a cylinder rigidly affixed to the outer frame, each preload piston coupled to a corresponding side of the shake table for applying a preload force to the shake table, a corresponding separate passive preload piston supported by a cylinder rigidly affixed to the outer frame, each passive preload piston coupled to the shake table on a corresponding side of the shake table opposite from each corresponding driven preload piston, a separate self-aligning spherical bearing coupled between each driven preload piston and a corresponding side of the shake table, and a separate self-aligning spherical bearing coupled between each passive preload piston and a corresponding side of the shake table, in which each passive preload piston applies a force against the shake table which opposes the preload force applied by the passive preload piston's corresponding driven preload piston, the preload bearings accommodating multiple degree of freedom vibrational motion induced to the shake table by the force generators.

4. The vibration test machine according to claim 3 in which the external force generators comprise electro-dynamic shakers.

5. The vibration test machine according to claim 3 in which the external force generators comprise electro-hydraulic shakers.

6. The vibration test machine according to claim 3 in which each driven preload piston is hydraulically driven with a gas charge applied at a low spring rate to enable the preload force applied by the corresponding driven preload piston to be maintained at an initial preload level throughout the induced vibrational motion applied by the force generators, and the corresponding driven preload pistons, to the shake table.

7. A method of applying vibration forces in multiple degrees of freedom to a test unit in a vibration test machine, the method comprising:

surrounding a shake table with a reaction mass in the form of a rigid stationary frame;

placing a group of external force generators outside the frame, each external force generator having a vibration energy output, the external force generators aligned around the outside of the frame so that the vibration energy outputs of the external force generators are transmitted to the shake table so that each of the external force generators produces a single degree of freedom motion along a unique axis; and transmitting the vibration energy output of each external force generator to the shake table through a corresponding pair of preload devices in a push-pull arrangement, the preload devices in each pair comprising a driven preload device which transmits the vibration output of a corresponding external force generator as a vibration energy input transmitted to the shake table against a resistance force provided by the rigid stationary frame, and a passive preload device aligned on an opposite side of the shake table for applying a force against the shake table which opposes the vibration energy input transmitted from the corresponding driven preload device, the force produced by each passive preload device acting against a resistance force provided by the rigid stationary frame, and in which the preload devices are connected to opposite sides of the shake table by separate self-aligning spherical bearings.

8. The method according to claim 7 in which the external force generators each comprise an electro-dynamic shaker.

9. The method according to claim 7 in which the external force generators each comprise an electro-hydraulic shaker.

10. The method according to claim 7 in which each driven preload device is a hydraulically driven piston with a gas charge applied at a low spring rate to enable the corresponding vibration energy input applied by the corresponding hydraulically driven piston to be maintained at an initial preload level throughout the corresponding vibration energy input applied by the corresponding hydraulically driven piston to the shake table.

11. The method according to claim 7 in which the preload devices combine to produce an initial biasing force of zero.

12. The method according to claim 7 in which the preload devices are biased to offset gravity loads.

13. The method according to claim 7 in which the preload devices are biased to create higher dynamic forces in one direction either toward or away from the external force generators.

14. The method according to claim 7 in which the preload devices are arranged to produce a biasing load that is angularly offset to produce controlled angular accelerations.

15. The vibration test machine according to claim 3 in which each cylinder for the driven preload pistons contains a controlled level of fluid pressure applied to the corresponding driven preload piston, and in which each cylinder for the passive preload pistons contains a controlled level of fluid pressure applied to the corresponding passive preload piston.

16. The method according to claim 7 in which the preload devices are independently controlled to produce different initial biasing forces.

* * * * *